United States Patent

[11] 3,562,634

| [72] | Inventor | Norman Latner<br>Jamaica, N.Y. |
|------|----------|-------------------------------|
| [21] | Appl. No. | 784,072 |
| [22] | Filed | Dec. 16, 1968 |
| [45] | Patented | Feb. 9, 1971 |
| [73] | Assignee | The United States of America as represented by the United States Atomic Energy Commission |

[54] METHOD FOR DETERMINING THE STATE OF CHARGE OF NICKEL CADMIUM BATTERIES BY MEASURING THE FARAD CAPACITANCE THEREOF
7 Claims, 4 Drawing Figs.

| [52] | U.S. Cl. | 324/29.5 |
|------|----------|----------|
| [51] | Int. Cl. | 31/04, H01m;<br>G01n 27/02; G01r 31/00 |
| [50] | Field of Search | 324/29.5;<br>340/249 |

[56] References Cited
UNITED STATES PATENTS

| 2,864,055 | 12/1958 | Kordesch et al. | 324/29.5 |
| 2,988,590 | 6/1961 | Andre | 324/29.5X |
| 3,118,137 | 1/1964 | Vincent | 324/29.5X |

FOREIGN PATENTS

| 1,126,502 | 3/1962 | Germany | 324/29.5 |

OTHER REFERENCES

Willihnganz et al. BATTERY IMPEDANCE, Farads Milliohms, Microhenries, ELECTRICAL ENGINEERING Sept. 1959, pp. 922— 925

*Primary Examiner*—Gerard R. Strecker
*Attorney*—Roland A. Anderson

ABSTRACT: Method for predicting the capacity of nickel-cadmium batteries with a standard reference curve that indicates battery capacitance as a function of the state-of-charge of a given nickel-cadmium battery type wherein the standard reference curve is used with the measurement of the capacitance of any battery of the given type to indicate the state-of-charge of the battery.

TRANSFORMER RATIO ARM BRIDGE (USED FOR MEASURING STATE OF CHARGE OF NICKEL-CADMIUM BATTERIES)

METHOD FOR DETERMINING THE STATE OF CHARGE OF NICKEL CADMIUM BATTERIES BY MEASURING THE FARAD CAPACITANCE THEREOF

BACKGROUND OF THE INVENTION

1. Field of the Invention

This invention relates to the testing of batteries and more particularly to apparatus and method for determining the state-of-charge of nickel-cadmium batteries.

2. Description of the Prior Art

It is desirable, and indeed often essential, in various remote nickel-cadmium battery operated systems, to determine the state-of-charge of the batteries due to the tendency thereof to have unpredictable battery capacities. One system that has been used to predict the battery capacity of nickel-cadmium batteries is the timer-charger system that employs a charge-discharge cycle for determining the ampere-hour discharge capacity of the battery. However, such systems generally involve test procedures of relatively long duration, up to 20—30 hours to complete. Moreover, since these systems determine the total ampere-hour capacity at a given discharge rate, these systems obviously have not been suitable as state-of-charge testers.

Another system, involves voltage/timer integrators or coulometers. In operation, these system are generally installed in a battery circuit with a freshly charged battery, and the output device indicates capacity on a scale corresponding to the total capacity given by the battery manufacturer. As the battery discharges, some of the discharge current causes electroplating in a coulometer gap and the output meter continuously senses and indicates the position of the gap. Charging the battery reverses the direction of the plating whereby the unit keeps track of the current going into and out of the battery. However, since the integrator is always a part of the battery circuit, it must be considered a "metering" device rather than a "measuring" unit, thus necessitating separate and expensive pieces of equipment for the batteries being used. Moreover, these voltage/timer integrators require separate power supplies. Also, recharge efficiency is not taken into account while typically 130—140percent of rated capacity must be returned to the cell to attain full battery charge. Thus, even if corrected for the nominal values, it is extremely difficult to compensate for the effects of temperature and charging rates on the recharge efficiency. Additionally, full scale calibration is based on an average total battery capacity and cell to cell variation may introduce significant errors. Furthermore, the important effect of self-discharge during storage or transit is not accounted for, and since this is a temperature dependent, nonlinear effect, battery losses may be up to 30 percent of capacity in 30 days or 50 percent in 60 days.

To overcome the defects and shortcomings of these prior art devices, some work has been done on cadmium-cadmium coulometers whose characteristics are similar to the nickel-cadmium batteries. However, a state-of-charge indicator based on such a system has not yet been fully developed, or it has been prone to many of the problems associated with the voltage//timer integrators.

SUMMARY OF THE INVENTION

This invention was made in the course of, or under a contract with the United States Atomic Energy Commission.

This invention provides the state-of-charge of nickel-cadmium batteries based upon the interreltion therein of their state-of-charge and farad capacitance. More particularly, this interrelation utilizes a standard reference curve for predicting the capacity of nickel-cadmium batteries wherein the farad capacitance of any nickel-cadmium battery of a given type indicates the state-of-charge thereof. In one embodiment, the standard reference curve is derived by discharging individual nickel-cadmium batteries at a constant rate of time to a fixed end time point continuously to indicate the state-of-charge of the batteries measuring the farad capacitance of the batteries with a bridge throughout the discharging, and averaging the results to provide a direct standard relationship curve between the capacitance and state-of-charge of the batteries whereby the capacitance of any of the batteries indicates the state-of-charge thereof with reference to the standard reference curve. With the proper selection of components and steps, as described in more detail hereinafter, the desired state-of-charge of any nickel-cadmium battery is easily, quickly and efficiently measured in any location.

The above and further novel features of this invention will become apparent in connection with the following detailed description when the same is read in connection with the accompanying drawings, and the novel features of this invention will be particularly pointed out in the appended claims.

DESCRIPTION OF THE PREFERRED EMBODIMENT

The method and apparatus of this invention are particularly useful in measuring the state-of-charge of nickel-cadmium batteries for use in expensive, high altitude balloon flights operating between 80 and 120 thousand feet to power equipment that measures air flow rate passing through filter paper while recording flow rate and temperature, where for example, nickel-cadmium batteries capable of delivering high currents are required for operating recorders, timers, solenoid valves, and/or other equipment where weight, reliability, cost, and predictable operating lifetime for up to eight hours or more are important considerations. However, the method and apparatus of this invention are useful in any application where the state-of-charge of nickel-cadmium batteries is desired.

Figure 1:
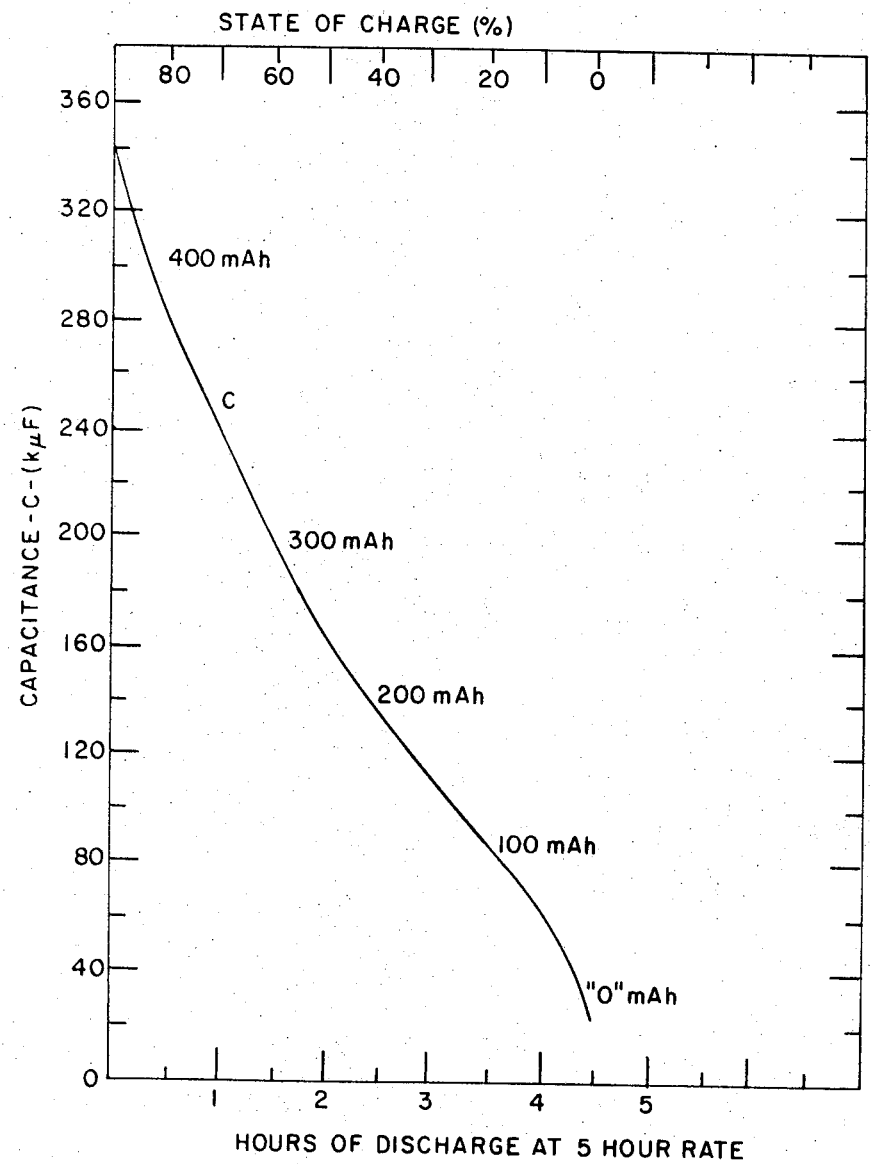
FIG. 1 is a graphic illustration of capacitance vs hours of discharge at a 5 hour rate (i.e. state of charge) of a BH500T, 1.25 volt cell as measured with a bridge in accordance with this invention.
Figure 2:
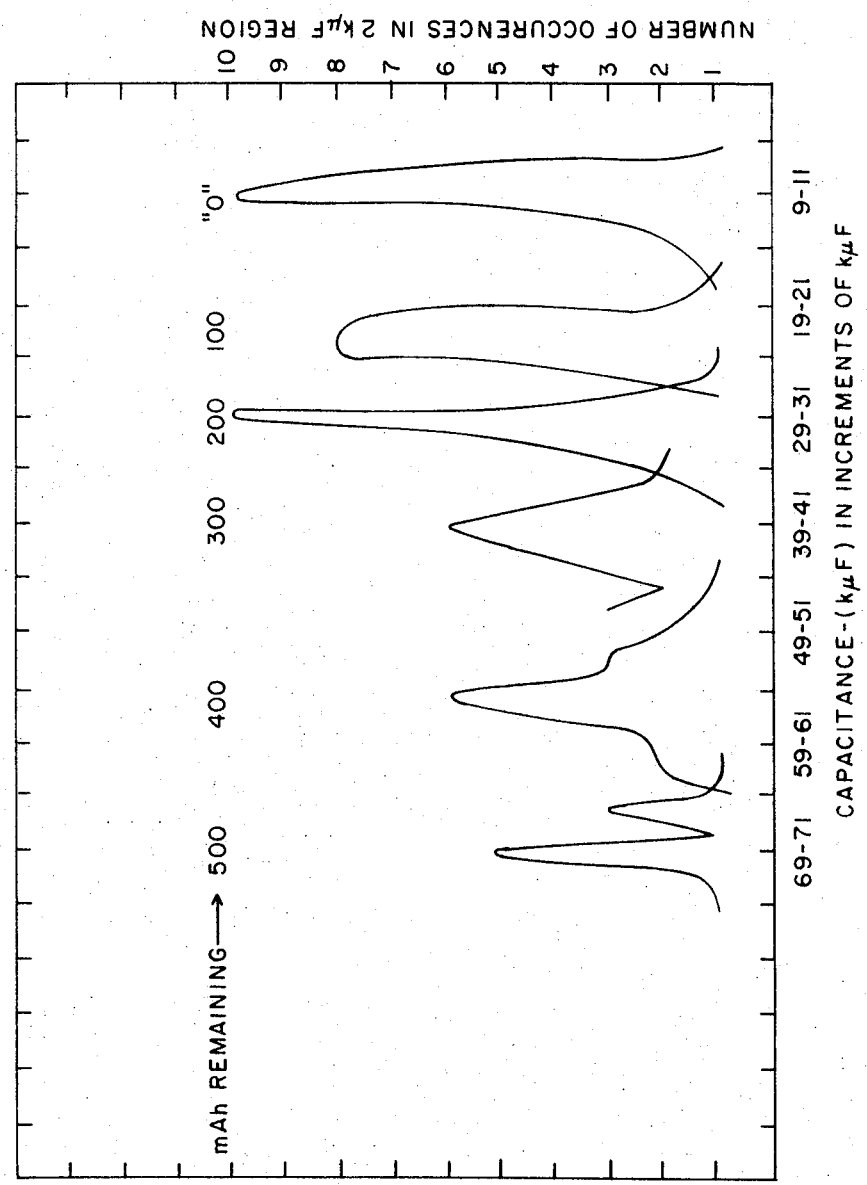
FIG. 2 is a graphic illustration of distribution curves like those of FIG. 1 at each 100 mAh remaining (25 runs of 14 500BH, 6v batteries)
Figure 3:
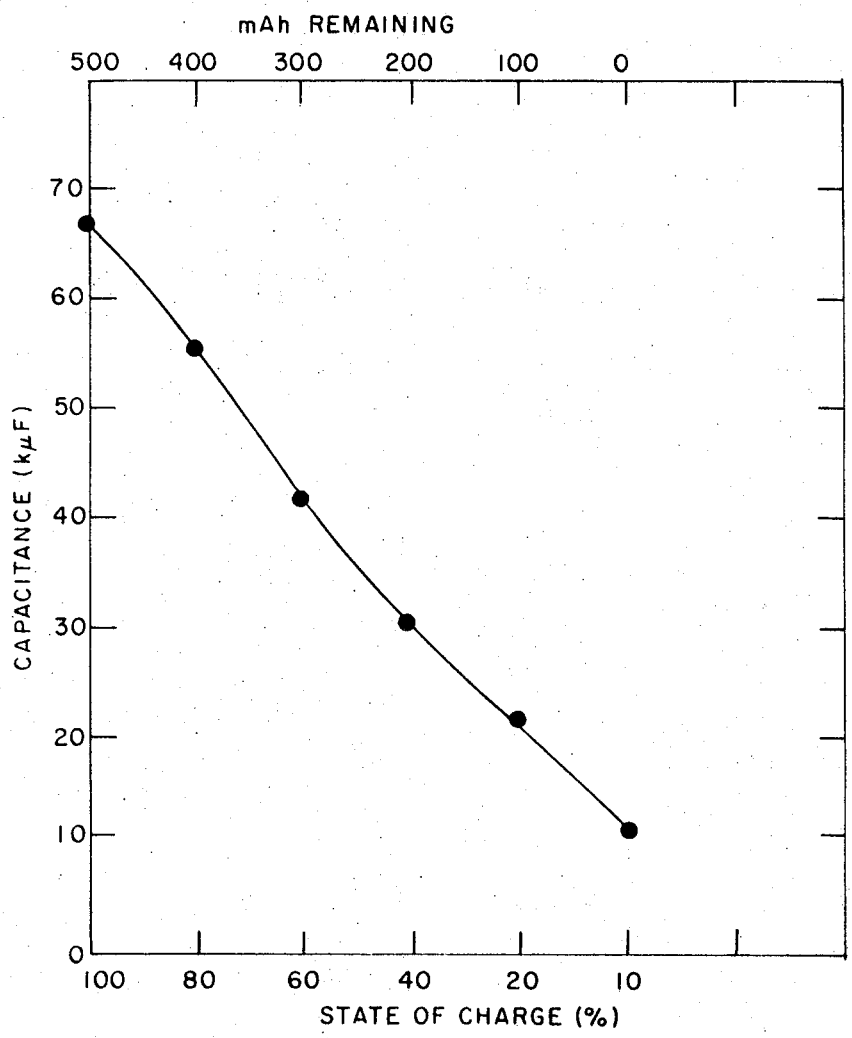
FIG. 3 is a graphic illustration of a standard reference curve of capacitance vs state-of-charge derived from the curves of FIG. 2.

In arriving at this invention, experiments have actually proved that the state-of-charge of nickel-cadmium batteries is a function of their capacitance. To this end, batteries were discharged at a constant rate with time to a predetermined end time point to establish the state-of-charge of the batteries, and the capacitance was measured throughout the discharge period and plotted against the state-of-charge. One set of such measurements is illustrated in FIG. 1. By repeating this procedure for several batteries of the same type a distribution curve was obtained as illustrated in FIG. 2. By averaging the results, a standard reference curve was derived for that battery type, as illustrated by FIG. 3. Thus, the measured capacitance of any of the batteries of that type gives the state-of-charge thereof with reference to its standard reference curve.

The state-of-charge was established by discharging a charged battery at a constant (5 hour) rate to an end time point taken as 1.0 volt, as illustrated by FIG. 1. At this point the battery was considered to be fully discharged and to have no remaining charge. An hour earlier, the battery was considered to be one-fifth charged; 2 hours earlier the battery was considered to be two-fifths charged, and so on to provide at least five successive state-of-charge measurement points that were equally spaced in time. Thus, the capacitance measurements made at any particular time could be related to the state-of-charge of the batteries whereby the related points provided a standard reference of this relationship for any and all batteries of the type measured and whereby the capacitance of any/or all of the individual batteries indicated the state-of-charge thereof on the standard reference curve, illustrated, for example, by FIG. 3.

In measuring the capacitance, a bridge was employed throughout the discharge period. Advantageously, this bridge is a 60 H$_z$, four lead, transformer ratio arm bridge that measures capacitance substantially independently of contact and internal battery resistance. Also, series capacitance (Cs) and internal impedance (Z) are directly indicate parameters, there is no multiplicity of nulls, the unit operates over a wide dynamic range, and it measures up to 5 farads capacity and down to 1 milliohm impedance. One practical bridge in the Wayne Kerr B522 Bridge, described in the "Instruction Manual" for Wayne Kerr Component Bridges, Model 521, Pub. TP13 and Model 522, Pub. TP32.

In measuring batteries over 1.2 volts, a large blocking capacitor is used in series with the external current leads of the bridge, wherein the capacitor is only large enough to offer negligible impedance at the measuring frequency. All direct current is thus eliminated from the current windings and the limitations are only those of the higher rated voltage transformer, which are restricted, for example, to 1.5 volts on range 1 (.05—5F), 8 volts on range 2 (5K — 50K$\mu$F), and 40 volts on range 3 (500 — 5K$\mu$E).

In relating the state-of-charge to capacitance for various types of standard nickel-cadmium batteries, extensive measurements were made on various battery types as indicated by the following:

TABLE I

BATTERIES USED IN THE EXPERIMENTAL VERIFICATION OF THE RELATIONSHIP BETWEEN FARAD CAPACITANCE AND STATE-OF-CHARGE

A. Standard Rate Batteries

Burgess - CD5 - 1.25V - 450 mAh, Button Type
Burgess - CD6 - 1.25V - 450 mAh, Cylindrical Type
Burgess - CD10- 1.25V -4000 mAh, Cylindrical Type
Burgess - CD21- 6.0V - 150 mAh, Button Stack
Burgess - CD28- 12.0V - 225 mAh, Button Stack B. High Rate Batteries Eveready - BH500T - 1.25V - 500 mAh, Button Type
Gould National - 500BH - 6.0V - 500 mAh, Button Stack In general, the standard reference curves produced clearly resembled each other in shape and were roughly linear. In this regard, for a particular cell construction, the capacitance magnitude generally only increased as the ampere-hour capacity thereof increased. Also, for cells of the same construction and rating, the capacitance tended to become proportionally less as the cells were stacked in increasing numbers to form the various standard battery types that are available.

Values of series capacitance for various sets of cells were actually tested from full charge to 1 bolt cut off. Based on average values, the maximum error encountered in predicting state-of-charge of any cell in the groups tested was only up to 7—8 percent of the total charge. Also, reproducibility of measurement was shown from three discharge cycles on the same batteries. In this regard, the point of maximum deviation showed an error of up to only about 5 percent from the average, while at the other points the curves agreed to about 1 or 2 percent.

In one plot, a cell showed an initial rise in capacitance for the first hour and beyond this rise the curve decreased in typical fashion. However, this behavior is avoided by letting cells stand a minimum of three hours before measurement. In this regard after being freshly charged the cell can have a high open circuit voltage, e.g. close to 1.4 volts.

It was also found that cells which have been stored for long periods of time e.g. at least 2 months, should not immediately be charged but should first be discharged down to at least 1.1 volts at a 5 hour rate and then charged to break down oxide that forms on the cadmium electrode. This is necessary since during the operation of the cell, oxygen must react with the metal cadmium. In addition, most nickel-cadmium batteries are conventionally shipped partially charged. However, batteries stored fully charged for 2 months show lower values of capacitance than initial readings before storage, thus this invention effectively indicates the loss of charge due to storage.

The most extensive set of measurements was made with 14, 5 cell, 6 volt 500 mAh Gould-National batteries. The capacitance vs state-of-charge characteristics were found to be approximately linear and similar in magnitude and shape.

Since these batteries are similar to capacitors in series, their measured values are lower than those found for the individual cells that compose them. For these batteries, the capacitance changes from about 70,000 to 7000$\mu$F over the discharge period. Cut off was taken as 5 volts (1.0volt/cell) with this point on the curve taken to indicate 0 mAh remaining. The curves were then marked off at 100 mAh increments and the capacitance of each battery per 100 mAh was determined. This data is given in terms of means and standard deviation in the following table;

TABLE II

TABULATION OF mAh REMAINING (STATE-OF-CHARGE) AND CORRESPONDING MEAN AND STANDARD DEVIATIONS (BASED ON 25 TOTAL RUNS USING 14, 6V, 500 mAh, GOULD-NATIONAL BATTERIES)

| mAh Remaining | Mean Capacitance (k$\mu$F) | Estimate of the Standard Deviation of the Observation-Sx (k$\mu$F) | % of Batteries Within Each Group Mean ± Sx | Mean ± 2 Sx |
|---|---|---|---|---|
| "0" mAh | 10.19 | 2.63 | 68% | 96% |
| 100 mAh | 21.84 | 2.87 | 84% | 96% |
| 200 mAh | 30.45 | 3.26 | 72% | 88% |
| 300 mAh | 41.45 | 4.21 | 68% | 96% |
| 400 mAh | 55.42 | 4.87 | 72% | 96% |
| 500 mAh | 66.85 | 4.65 | 75% | 93% |

Distribution curves based on 25 runs for 14 batteries of this type indicate good separation between each of the 100 mAh increments as shown in FIG. 2.

In establishing the standard reference curve, the average capacitance at each 100 mAh interval was used to plot the curve. For example, the values of Table II were used to plot the standard reference curve of FIG. 3 for 6 volt Gould-National batteries. Comparing the individual battery characteristics to this curve allows one to determine the maximum error associated with predicting the state-of-charge, i.e. mAh remaining. Thus with a knowledge of the maximum error and the availability of the standard reference curve, any nickel-cadmium battery of this or any other type, can be quickly, easily, dependably, inexpensively and accurately evaluated as to state-of-charge simply by fitting its farad capacitance to the reference curve.

This invention has the advantage of providing a quick, easy, simple and dependable, method of determining the state-of-charge of nickel-cadmium batteries and in providing standard reference curves therefor. In actual practice, moreover, the method of this invention has been used in accurately determining the capacity of a wide variety of nickel-cadmium batteries, comprising various types of newly and recharged nickel-cadmium batteries exposed to a variety of temperatures and conditions of storage. As such, this invention is particularly adapted to testing nickel-cadmium batteries for expensive high altitude balloon flights, but, it is also useful in testing nickel-cadmium batteries for any other application.

Figure 4:
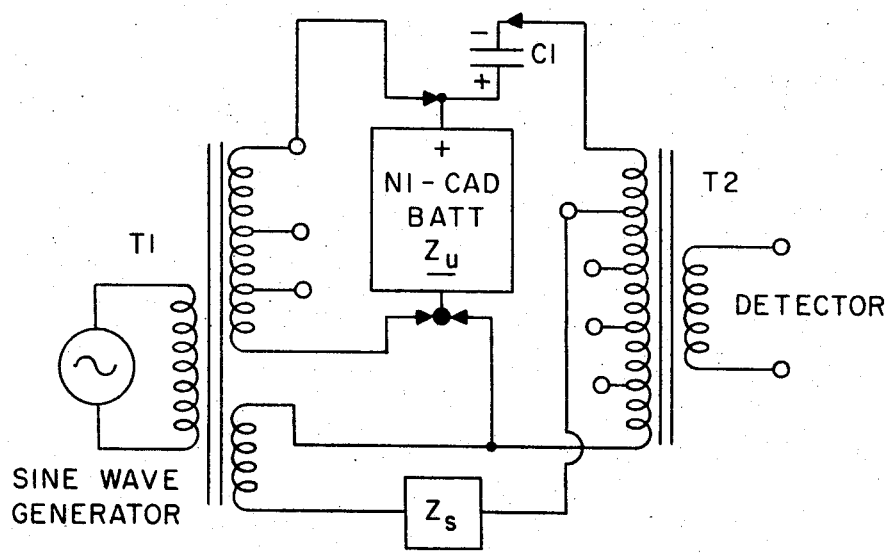

The simplified schematic arrangement of the transformer ratio-arm bridge used in obtaining the data of FIG. 1 in accordance with this invention, is shown in FIG. 4.

$T_1$ and $T_2$ are, respectively, voltage and current transformers. The sine wave generator (source) is connected to the primary winding of $T_1$, the secondary of which is tapped, as shown, to form one of the ratio arms of the bridge. The primary winding of $T_2$, which also has a series of tappings, forms the second ratio arm. The bridge neutral, or third terminal, is connected between the two transformers. The secondary winding of $T_2$ provides the output to the detector circuit.

The standard and unknown impedances, $Z_s$ and $Z_u$, respectively, in which $Z_u$ is the battery being measured, are connected to the bridge as shown in the FIG. Basically, voltages of equal amplitude but opposite phase are applied across $Z_s$ and $Z_u$ from the secondary windings of $T_1$. Under this condition, when the standard an unknown impedances are equal, the ampere turns produced in the primary winding of $T_2$ are equal in magnitude but opposite in phase. The resultant core flux is therefore zero; no output voltage is induced in the secondary winding of $T_2$, and the detector indicates a balanced condition of the bridge.

When the standard and unknown impedances are unequal, there is a resultant core flux in $T_2$. A voltage is induced in the secondary winding, and the detector indicates an off balance condition.

The balance can be restored either by adjusting the value of $Z_s$ until the two impedances are again equal, or by adjusting the voltage applied to $Z_s$, or by a suitable combination of the two.

The range of measurement possible with a given standard impedance can be further extended by connecting the unknown impedance to any one of a series of tapping on both $T_1$ and $T_2$.

Due to the fact that when the bridge is balanced there is no voltage developed across the winding of $T_2$, any impedance between $Z_u$ and the bridge neutral on the current transformer side will not affect the measurement accuracy. The only effect of such an impedance is to reduce the detector sensitivity, which can be compensated by increasing the gain of the detector circuit.

It is possible to connect an impedance between $Z_u$ and the bridge neutral on the voltage transformer side without affecting the measurement accuracy, since the loading which this imposes on $T_1$ reduces both the voltage applied to $Z_u$ and the voltage applied to $Z_s$ in the proportion of the turns ratio.

Capacitor $C_1$ is used to block direct current from flowing in winding $T_2$ (due to the battery).

I claim:

1. Method for providing a standard reference curve for predicting the capacity of nickel-cadmium batteries wherein the farad capacitance of the batteries is used to determine the state-of-charge of the batteries, comprising the steps of:
   a. discharging the nickel-cadmium batteries at a constant rate with time to a fixed end point of time continuously to indicate the state-of-charge of the batteries; and
   b. measuring the farad capacitance of the nickel-cadmium batteries with a bridge throughout said discharging for providing a direct relationship between the farad capacitance and the state-of-charge of the batteries whereby the results can be averaged to provide a standard reference curve that indicates that the battery capacitance is a function of the state-of-charge of the batteries thereby to indicate the state-of-charge of any of said batteries by measuring the farad capacitance thereof.

2. The method of claim 1 for determining the state-of-charge of a nickel-cadmium battery wherein the batteries are initially discharged, fully charged, left standing for three hours, and then the farad capacitance thereof is measured whereby the measured capacitance indicates the state-of-charge of the battery with reference to the standard reference curve.

3. The method of claim 2 in which said initial discharging is down to 1.1 volts at a ten hour rate and is followed by charging that breaks down oxide on the cadmium electrode of said battery.

4. Method for measuring the capacity of nickel-cadmium batteries whose terminal voltage remains constant over a relatively wide range of charge, comprising the steps of nondestructively measuring the farad capacitance of said nickel-cadmium batteries substantially independently of contact and internal battery resistance and selectively determining from said capacitance measurement the state-of-charge of said batteries without discharging the same.

5. The method claim 4 in which said measured farad capacitance is a function of the state-of-charge of said batteries corresponding to the curve of FIG. 3 for the use of said batteries as remote energy sources for balloon flights.

6. The method of claim 4 wherein said measured farad capacitance corresponds to the relationship of the farad capacitance to the state-of-charge of nickel-cadmium batteries of a single type selected from the group, consisting of button, cylindrical and button stack nickel-cadmium batteries, and said measurement of said farad capacitance is selectively made with batteries of that type.

7. The method of claim 4 wherein said farad capacitance of said batteries is measured with a 60 $H_z$ four lead, transformer ratio arm bridge for measuring said capacitance substantially independently of the contact and internal resistance of said batteries.